Nov. 14, 1967  E. J. HAYES ETAL  3,352,382
CALIPER-TYPE DISC BRAKE WITH YIELDABLE SUPPORT
Filed April 11, 1966  5 Sheets-Sheet 3
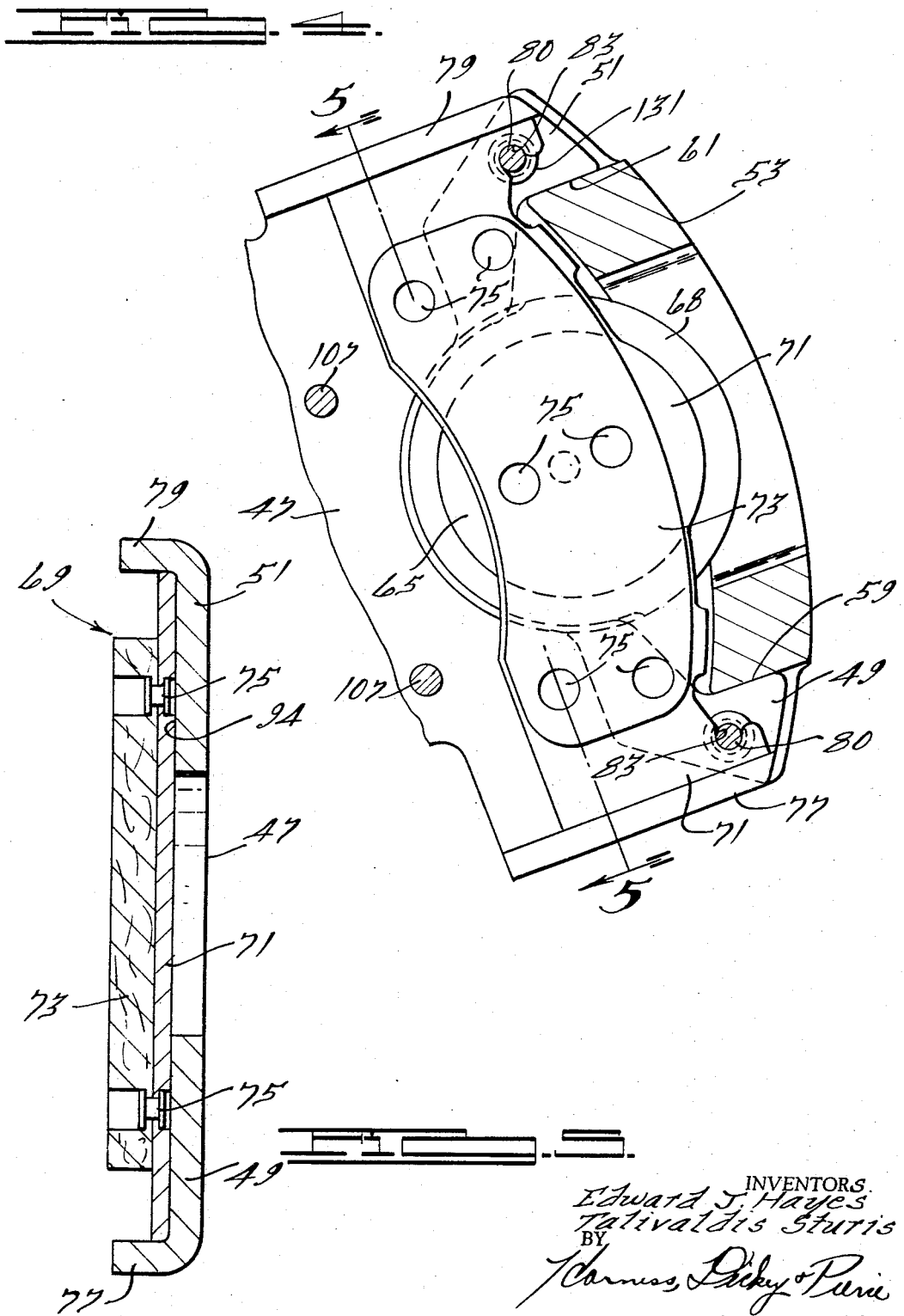
INVENTORS.
Edward J. Hayes
Tatvaldis Sturis
BY
Carness, Dickey & Pierce
ATTORNEYS

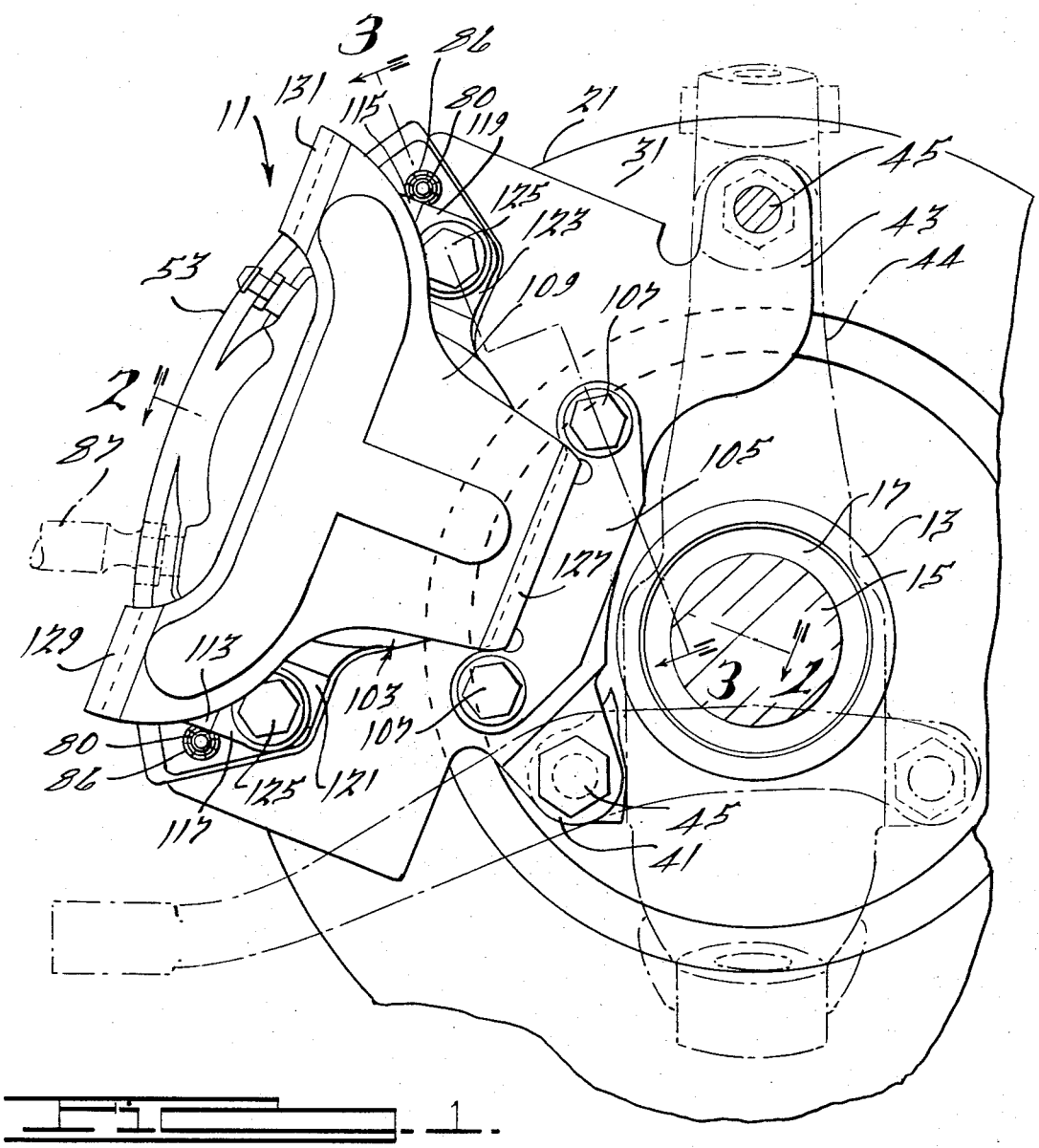

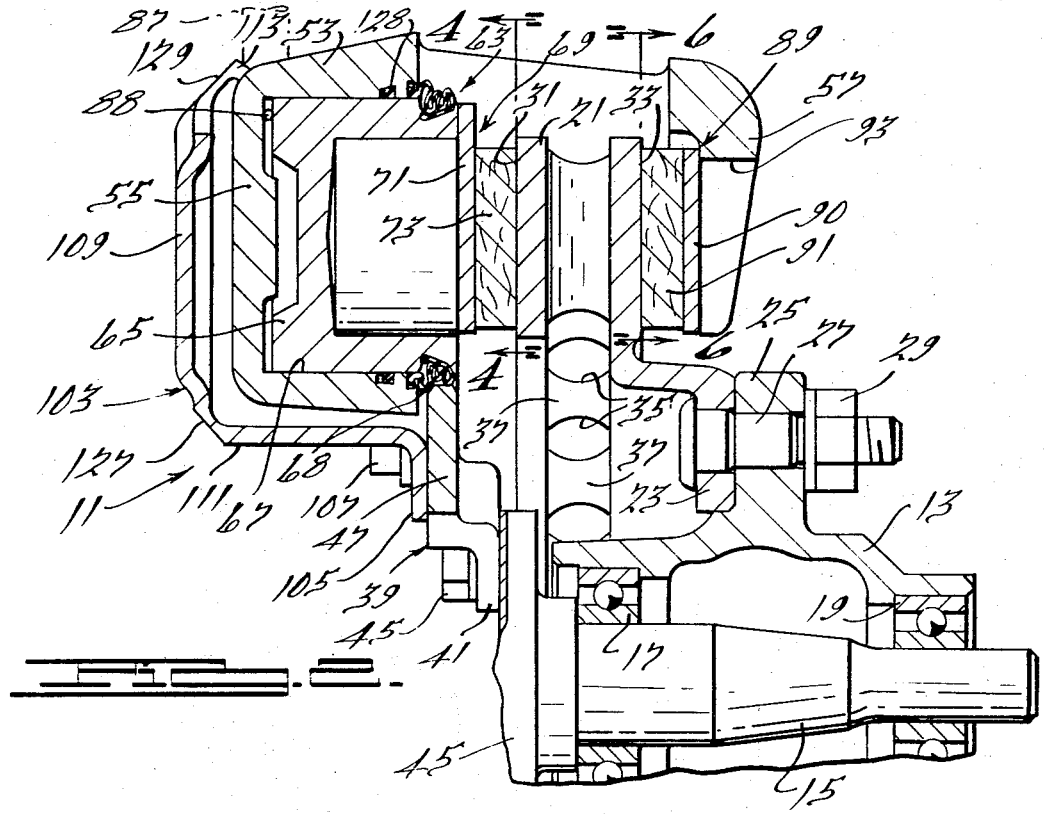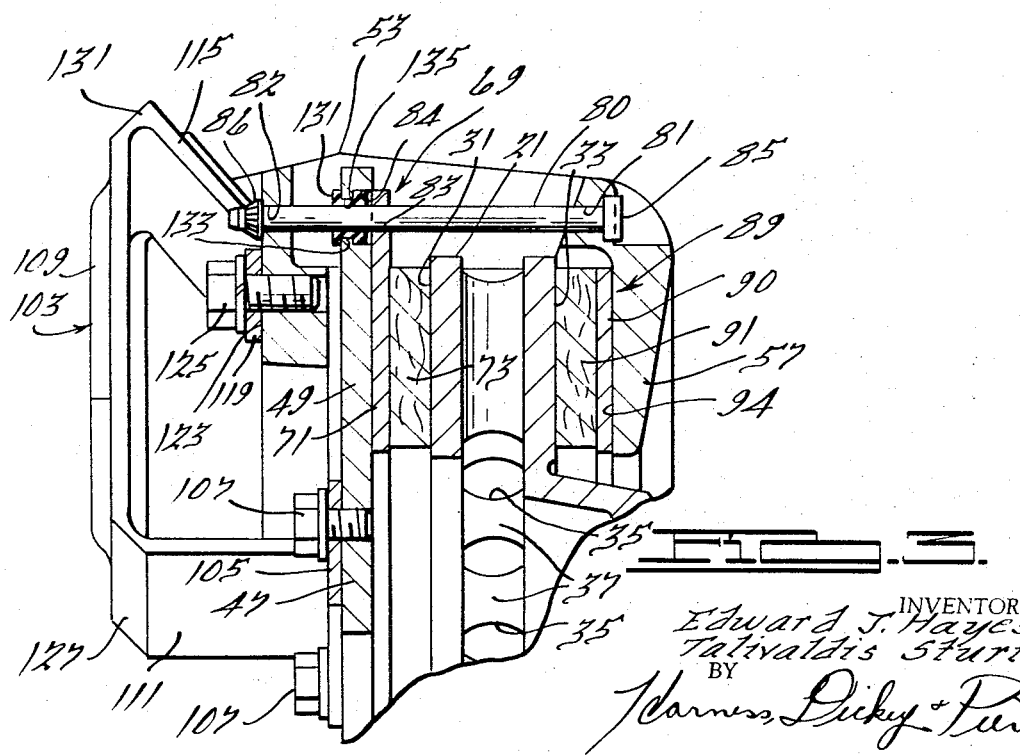

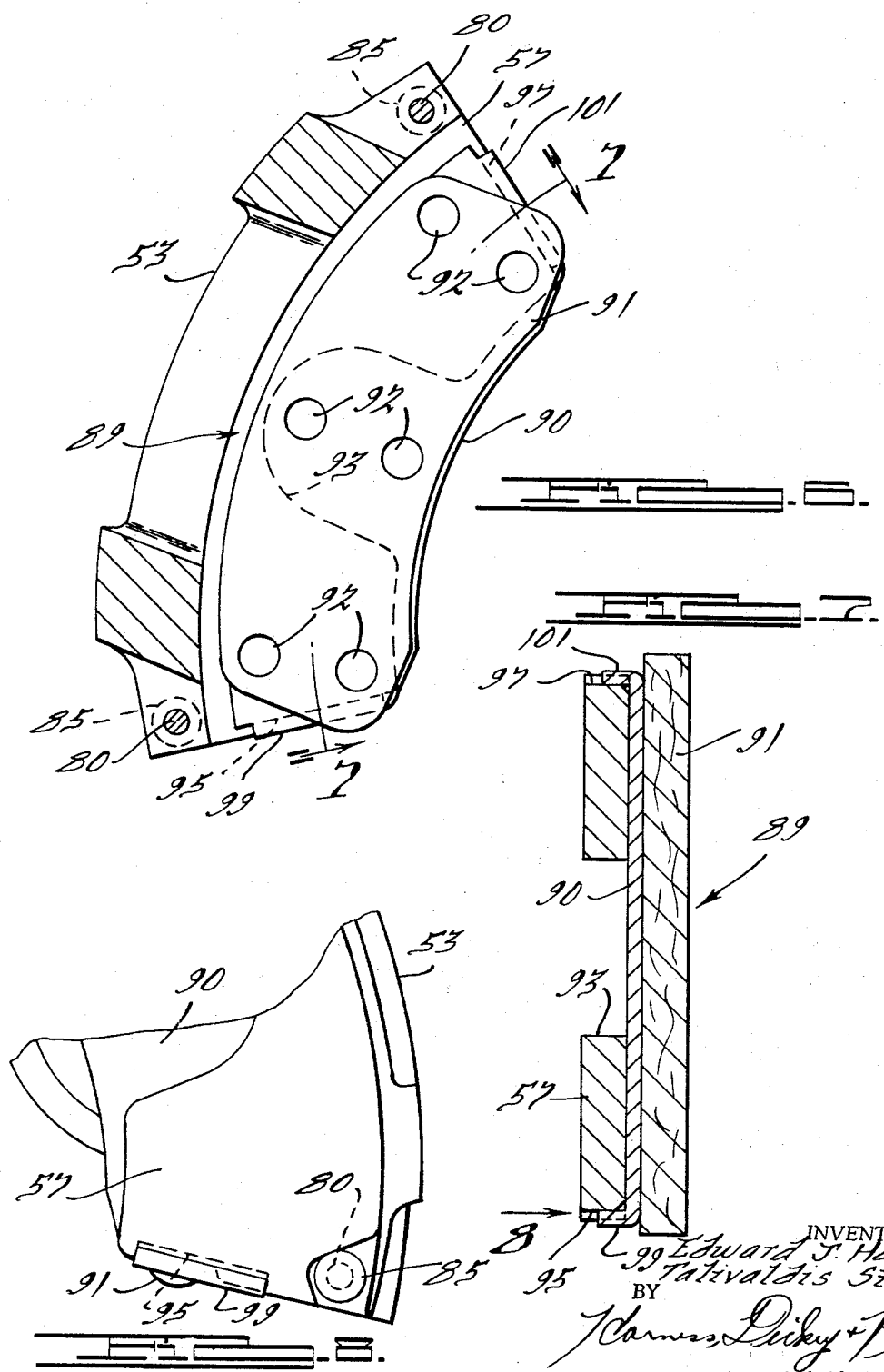

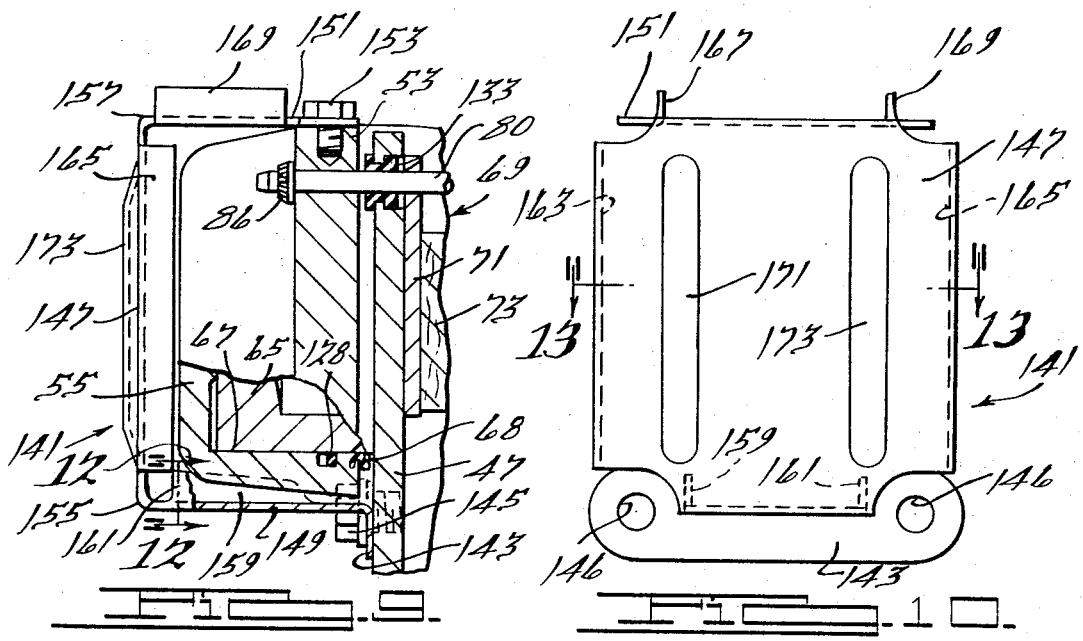
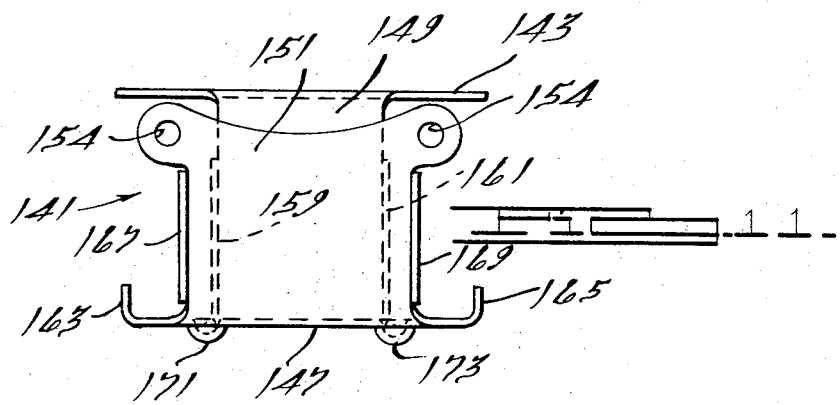
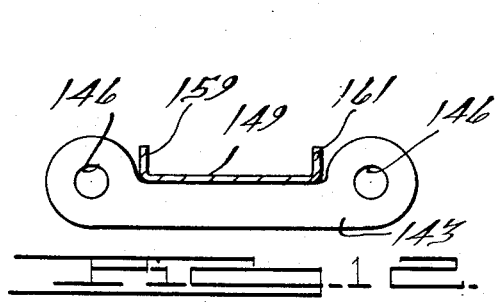
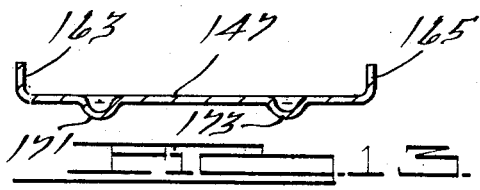
INVENTORS
Edward J. Hayes
Talivaldis Sturis
BY
ATTORNEYS United States Patent Office 3,352,382
Patented Nov. 14, 1967

3,352,382
CALIPER-TYPE DISC BRAKE WITH YIELDABLE
SUPPORT
Edward J. Hayes, Livonia, and Talivaldis Sturis, Plymouth, Mich., assignors to Kelsey-Hayes Company, Romulus, Mich., a corporation of Delaware
Filed Apr. 11, 1966, Ser. No. 541,732
26 Claims. (Cl. 188—73)

ABSTRACT OF THE DISCLOSURE

Two embodiments of sliding caliper type disc brake assemblies for use in motor vehicles. Each embodiment includes a caliper assembly that straddles a portion of the brake rotor and which is supported for movement in a plane substantially perpendicular to the braking surfaces of the rotor by an integral, yieldable support member. The support member has a first portion that is fixed against rotation, a second portion that is integrally connected to the first portion and a third portion that is integrally connected to the second portion and which is affixed to the caliper housing. The area connecting the first and second portions and the area connecting the second and third portions is thinner than the remainder of the portions to promote flexure at these points to facilitate the sliding movement of the caliper.

---

This invention relates generally to brakes, and particularly to an improved disc brake having a yieldable support.

The disc brakes to which the present invention relates include those having a disc or rotor secured for rotation with a vehicle wheel and a caliper or housing embracing a portion of the rotor. A pair of brake shoes are non-rotatably supported on opposite sides of the rotor and are movable into frictional engagement with opposite parallel faces thereof. The caliper has generally opposed legs lying on opposite sides of the rotor. A piston is carried by one leg of the caliper to directly press one brake shoe into frictional engagement with one face of the rotor. The caliper is movable in a generally axial direction so that the reaction force to piston energization biases the caliper in a direction, causing the other leg of the caliper to press the other brake shoe against the opposite face of the rotor.

In order to achieve even brake lining wear and, therefore, full use of the linings, it is desirable that the motivating forces pressing the brake shoes into frictional engagement with the rotor faces act along paths perpendicular to the rotor faces, or as near as possible thereto. It is, therefore, important that the caliper cylinder bore in which the piston operates be held perpendicular to the rotor faces and that the caliper move in a direction parallel to the axis of this cylinder bore.

As the brake shoes become worn, the normal caliper position is desirably adjusted to prevent excessive pedal travel when the brakes are applied. However, this adjustment should be effected in a manner maintaining the aforesaid caliper orientation. In addition, the caliper is subjected to various external forces such as centrifugal forces during vehicle cornering, forces during braking tending to twist the caliper supporting structure, and shock forces when the vehicle wheel hits a bump. Thus, the caliper must be supported in a fashion to resist undesirable movement or reorientation thereof due to the effect of these forces.

In addition, it is desirable that the caliper supporting structure be constructed in a manner assuring its proper movement irrespective of the accumulation of dirt, grease, water, ice, salt and other foreign matter.

Furthermore, construction, assembly and maintenance costs for high production devices such as disc brakes always play a vital role in their commercial acceptability. It is, therefore, important that a disc brake embodying the features necessary to accomplish the above operating characteristics be capable of relatively inexpensive manufacture and be easily and inexpensively assembled and serviced. Also, the disc brake assembly as a whole should be such as to afford smooth, vibration and rattle-free performance throughout its useful life.

An important object of the present invention therefore is to provide an improved disc brake of the type referred to which is adapted to achieve a good brake shoe wear pattern and in which the desired caliper orientation is maintained against external forces.

Additional objects of the present invention include the provision of a disc brake of the above character which maintains consistent operating characteristics irrespective of deposits of dirt, grease and other foreign matter thereon and which will not freeze up if it becomes wet and is subjected to cold temperatures.

Further objects of the present invention include the provision of a disc brake of the above character which is relatively inexpensive to manufacture, easy and inexpensive to assemble and service, durable in construction and reliable and consistent in result, and which affords smooth, rattle and vibration-free performance.

Other objects and advantages of the present invention will become more apparent from a consideration of the following detailed description taken in conjunction with the drawings in which:

FIGURE 1 is an elevational view, partly in section, illustrating a typical installation of a disc brake embodying a preferred form of the present invention;

FIG. 2 is a sectional view of FIG. 1 taken along the line 2—2 thereof;

FIG. 3 is a sectional view of FIG. 1 taken along the line 3—3 thereof;

FIG. 4 is a sectional view of FIG. 2 taken along the line 4—4 thereof;

FIG. 5 is a sectional view of FIG. 4 taken along the line 5—5 thereof;

FIG. 6 is a sectional view of FIG. 2 taken along the line 6—6 thereof;

FIG. 7 is a sectional view of FIG. 6 taken along the line 7—7 thereof;

FIG. 8 is a fragmentary view of FIG. 7 looking in the direction of the arrow "8";

FIG. 9 is a view, similar to FIG. 2, showing a modified form of the present invention;

FIG. 10 is an elevational view of the yieldable caliper support illustrated in FIG. 9;

FIG. 11 is a view of FIG. 10 looking in the direction of the arrow "11";

FIG. 12 is a sectional view of FIG. 9 taken along the line 12—12 thereof; and

FIG. 13 is a sectional view of FIG. 10 taken along the line 13—13 thereof.

Broadly described, the present invention includes a housing having generally opposed legs lying on opposite sides of a rotor that is secured for rotation with a vehicle wheel, fluid motor means carried by one of said legs for pressing a first brake shoe means into frictional engagement with a first rotor face, said fluid motor means, when energized, biasing said housing in one direction to press a second brake shoe means against a second rotor face opposite said first face, yieldable means having a fixed first portion and a second portion remote from said first portion in supporting engagement with and biasing said housing in said one direction, said yieldable means having first and second spaced pivot means intermediate said first and second portions allowing relative translation between said first and second portions in said one direction normal to said rotor faces.

Referring now more specifically to the drawings, a disc brake embodying the present invention is illustrated generally at 11 in FIGS. 1 and 2 and is shown associated with a vehicle wheel assembly having a hub 13 rotatably supported on a stationary wheel spindle 15 by bearings 17, 19 and to which a conventional wheel rim (not shown) is adapted to be secured. A brake disc or rotor 21 is provided with an attaching flange 23 secured to a flange 25 on the hub 13 by bolts 27 and nuts 29 and has a pair of oppositely disposed brake shoe engaging radial faces 31, 33. A plurality of radially extending openings 35 in the rotor 21 are spaced apart by webs 37 which serve as fan blades to move cooling air outwardly through the openings 35 during turning movement of the rotor 21.

A torque plate or spider 39 has a pair of flange-like projections 41, 43 adapted to be fixed by screws 45 to a steering knuckle assembly 44 nonrotatably supported by the wheel spindle 15 through a conventional king pin arrangement (not shown) when the disc brake is associated with a vehicle front wheel. In the rear wheel version, the spider 39 may have flange means secured directly to a flange 45 integral with the stationary wheel spindle 15. The spider 39 has a web 47 offset from the projections 41, 43 and provided with a pair of spaced, outwardly extending torque arms 49, 51 integral therewith.

A generally C-shaped housing or caliper 53 is provided with generally opposed legs 55, 57 lying on opposite sides of the rotor 21 and which legs are disposed in spaced confronting relation to arcuate portions of the rotor faces 31, 33. The caliper is snugly but slidably received between opposed torque reaction faces 59, 61 on the torque arms 49, 51, respectively. A hydraulic motor 63 is carried by the caliper leg 55 and is seen to include a piston 65 slidably disposed in a cylinder bore 67 formed in the leg 55. A flexible boot 68 is fixed at its ends to the caliper leg 55 and the piston 65 to prevent contamination of the sliding piston and cylinder bore surfaces.

The outer end of the piston 65 is positioned to engage a brake shoe 69 including a backing plate 71 having brake lining 73 secured thereto by bonding or rivets 75 so that when the piston 65 moved toward the right, as seen in FIG. 2, the brake lining 73 is pressed into frictional engagement with the rotor face 31. The brake shoe 69 is prevented from turning with the rotor 21 by a laterally spaced pair of right-angle flanges 77, 79 on the torque spider 39 between which the brake shoe backing plate 71 is confined (FIGS. 4 and 5). A spaced pair of pins 80 extends through aligned openings 81, 82 at opposite ends of the caliper 53. The pins 80 each is received in recesses 83 in the backing plate 71 and extend through openings 84 in the torque arms 49, 51 aligned with the openings 81, 82 to position the brake shoe 69 during assembly. Each pin 80 has an enlarged head 85 at one end and has a spring washer 86 pressed on its other end to hold the pins 80 against longitudinal movement relative to the caliper 53.

The hydraulic piston 65 is moved toward the right, as seen in FIG. 2, by admitting pressurized fluid to the cylinder bore 67 behind the piston 65 through a conduit 87 connected to a passage 88 in the caliper leg 55. This fluid pressure biases the caliper 53 toward the left as seen in the figure and through the caliper leg 57, which is the reaction portion of the brake, presses a brake shoe 89 against the rotor 21. As seen best in FIGS. 6–8, the brake shoe 89 includes a backing plate 90 seated against a flat surface 94 on the caliper leg 57 and having brake lining 91 secured thereto by bonding in the usual manner or by rivets 92. The caliper leg 57 is centrally apertured at 93 to reduce the overall weight of the device and has a pair of slots 95, 97, one at either side thereof, to snugly receive right angle flanges 99, 101, respectively, on either end of the backing plate 90. Thus, when the caliper 53 and the brake shoe 89 are biased toward the left, as seen in FIG. 2, the brake lining 91 is pressed into frictional engagement with the rotor face 33 and acts conjointly with the lining 73 of brake shoe 69 to slow or stop the vehicle wheel.

As set forth hereinabove, it is necessary that the motivating forces pressing brake linings 73, 91 of shoes 69, 89 into frictional engagement with the rotor faces 31, 33 act perpendicular to the faces 31, 33 or as near as possible thereto to insure the desirable brake lining wear pattern. Furthermore, the motivating forces must continue to act in this manner as the brake linings 73, 91 become worn and the position of the caliper 53 should be adjusted relative to the rotor to take up slack resulting from lining wear in order that the pedal travel required to effect braking remains substantially constant.

According to the present invention, a novel flexible strap 103 supports the caliper 53 relative to the rotor 21 in the desired manner. As shown in FIGS. 1–3, the strap 103 has an inner, radial flange 105 fixed to the torque plate web 47 by screws 107. A laterally offset arm 109 has one end interconnected with the flange 105 by a web 111 and is disposed in spaced confronting relation to the caliper leg 55. A pair of reversely bent spring fingers 113, 115 taper inwardly from the arm 109 at its other end and each forms an acute angle therewith. The fingers 113, 115 have angled terminal ends 117, 119 which bear flat against seats 121, 123 on the caliper 53 and are fixed thereto by screws 125. The strap 103 has reduced thickness areas 127, 129, 131 between the web 111 and arm 109, and between the arm 109 and fingers 113, 115, respectively, forming a pair of parallel, spaced, solid state hinges or pivot axes about which the arm 109 can pivot relative to the web 111 and about which the fingers 113, 115 can pivot relative to the arm 109.

When the parts are assembled, the flexible strap 103 is stressed to act in a spring-like manner to bias the caliper 53 toward the left, as seen in FIGS. 2 and 3 and causes the brake lining 91 of the shoe 89 to normally engage the rotor face 33. In a conventional vehicle installation having new brake linings, the lining 91 engages the face 33 under a force of about 40 pounds. With a coefficient of friction of about 0.35 and a mean radius of the braking surface of about 4.5 inches, this results in a torque of about 60 inch-pounds, which is well within the accepted range. Even at prolonged high speed driving and with new brake linings, the temperature increase of the rotor 21 will not exceed about 40° F.

With this construction, when the hydraulic motor 63 is pressurized, the piston 65 moves toward the right, as seen in FIG. 2, and presses the lining 73 of brake shoe 69 into frictional engagement with the rotor face 31. The reaction to motor pressurization biases the caliper 53 toward the left and increases the frictional engagement between the lining 91 of brake shoe 89 and the rotor face 33. The only caliper movement occurring here is that necessary to increase the frictional contact between the lining 91 and the rotor face 33 and is quite small. When the fluid pressure to the motor 63 is released, the piston 65 backs off slightly to release the lining 73 of brake shoe 69 from tight engagement with the rotor face 31 and the caliper 53 is released so that the lining 91 of brake shoe 89 engages the rotor face 33 solely under the spring force of the flexible strap 103.

An annular seal 128 carried within the cylinder bore 67 sealingly engages the piston 65 and has a generally rectangular cross-sectional configuration so that when the piston 65 moves toward the right during brake application, the seal 128 is twisted or distorted. Thus, when the fluid pressure to the motor 65 is released, the seal 128 springs back slightly and releases the lining 73 of brake shoe 69 from tight engagement with the rotor face 31.

As the brake lining 91 becomes worn, the spring-like flexible strap 103 automatically shifts the caliper 53 toward the left as seen in FIGS. 2 and 3 and keeps the lining 91 of brake shoe 89 in contact with the rotor face 33, the contact force between the lining 91 and the face 33 becoming progressively less as the caliper 53 moves in this direction. As the caliper 53 undergoes this movement, the strap arm 109 swings in a counterclockwise direction about the hinge area 127 while the fingers 113, 115 swing in a counterclockwise direction about the hinge areas 129, 131. The strap arm 109 and fingers 113, 115 are preloaded by elastically bending them in a clockwise direction about these hinge areas so that they move under this elastic loading in a counterclockwise direction as the line 91 wears. Because of the solid nature of these hinge areas 127, 129 and since the strap 103 is fixed to the torque plate 39 and to the caliper 53, there are no sliding surfaces between these parts which can become contaminated or freeze up during use.

The spring-like pivotal force exerted on the fingers 113, 115 at the hinge areas 129, 131 and the pivotal force exerted on the arm 109 at the hinge area 127 are such that as the caliper 53 moves with wear of the lining 91, the axis of the cylinder bore 67 remains perpendicular to the rotor faces 31, 33 and the surface 94 on the caliper leg 57 against which the backing plate 90 of brake shoe 89 is seated remains parallel to these faces 31, 33. In order to achieve this, the elastic spring force on the arm 109 which pivots the arm 109 about the hinge area 127 is slightly greater than the elastic spring force tending to pivot the fingers 113, 115 about the hinge areas 129, 131 because of the greater length of the arm 109 as compared with the fingers 113, 115. This insures that the brake shoe motivating forces always act normal to the rotor faces 31, 33. Of course, if the length of the arm 109 and the fingers 113, 115 were equal or if the arm 109 was shorter than the fingers 113, 115, the spring force on the arm 109 should be equal to or less than the spring force on the fingers 113, 115, accordingly.

Thus, as the lining 91 gradually becomes worn, the caliper 53 shifts toward the left as seen in FIG. 2 and keeps the lining 91 always in engagement with the rotor face 33. The lining 73 of brake shoe 69 remains close to or lightly engaging the rotor face 31 and the piston 65 is not knocked back or toward the left within the cylinder bore 67 so that in this way, the pressurization of the motor 63 and therefore pedal travel needed to energize the brakes is indeed small and remains relatively constant. In addition, the spring-like action of the strap 103 and the light contact between the linings 73, 91 and the rotor faces 31, 33 keeps these parts from vibrating and rattling. Significantly, because of the maintained orientation of the caliper 53 relative to the rotor faces 31, 33, the resulting wear pattern on both linings 73, 91 is good and the brake lining life is maximized. As the caliper 53 shifts during wear of the lining 91, the caliper moves slightly in a radial direction relative to the rotor 21. However, this movement is insignificant both because it is a very small amount and because the radial dimension of the rotor faces 31, 33 is slightly greater than that of the linings 73, 91 to allow a small amount of relative radial movement therebetween.

Another feature of the present invention is the connection between the caliper 53 and the torque plate 47 provided by the pins 80. Thus, the pins 80 are prevented from movement relative to the caliper 53 by the pin heads 85 and the spring washers 86. A resilient grommet 131 is in snug surrounding relation to each of the pins 80 and each has an annular groove 133 in its outer surface receiving an annular flange 135 on the torque arms 49, 51 adjacent the openings 84 (FIG. 3). The grommets 131 normally frictionally hold the pins 80 against axial movement relative to the torque plate 47 and overcome, for example, centrifugal forces tending to move the caliper 53 in a direction normal to the rotor faces 31, 33 when the vehicle wheel (not shown) is turned during cornering. This prevents the caliper 53 from bearing inboard or toward the left as seen in FIG. 2 which would cause undesirable frictional engagement between the lining 91 and the rotor face 33 and premature wear of this lining and excessive rotor heating. In addition, the grommets 131 afford an additional cushioned support for the caliper 53 maintaining its orientation relative to the rotor 21 against sharp blows as when the vehicle wheel (not shown) hits a bump and provides a rattle-free construction for these parts.

Furthermore, and perhaps most importantly, the caliper 53 is prevented from moving outboard or toward the right as seen in FIG. 2 under centrifugal forces acting thereon in this direction. Were this caliper movement not prevented, greater piston travel and correspondingly greater pedal travel would be necessary to effect braking on the rotor 21. The frictional gripping forces exerted by the grommets 131 on the pins 80 are overcome by the spring-like force exerted by the flexible strap 103 on the caliper 53 so that the lining 91 of brake shoe 99 is always seated lightly against the rotor surface 33.

During braking, frictional forces between the rotor surface 33 and the lining 91 create a torque couple tending to twist the caliper 53 relative to the torque plate 47. This torque couple would normally result in uneven wear of one or both ends of the linings 73, 91. However, it has been discovered that by using the flexible strap 103 described and securing it to the caliper 53 by the screws 125 at a position spaced axially from the torque arms 49, 51 as ilustrated, the twisting couple on the caliper is essentially overcome and exists, if at all, only during the very initial stages of lining wear. Tests have shown that with the flexible strap construction illustrated and described, the ends of each lining 73, 91 at most initially wear a maximum of 15 to 20 thousandths more than the lining midportion and thereafter the brake lining wear remains essentially constant across the full lining surface. This extent of uneven lining wear is well within the desirable limits and provides a wear pattern that is highly acceptable.

Another inherent advantage of the present invention resides in the ease with which it can be assembled and disassembled to a vehicle wheel. Thus, the disc brake 11 may be fully assembled and secured to the torque plate 47 when shipped and all that is needed to install the brake on a vehicle wheel is to fasten the torque plate 47 to the steering knuckle or other nonrotating vehicle component by the screws 45. This is highly advantageous in that the time and skill required of the workman to mount the disc brake 11 is significantly small and consistent results are attained.

A modified form of flexible strap is illustrated in FIGS. 9–13. The modified strap is shown in FIG. 9 associated with a disc brake essentially the same as that illustrated and described above for the embodiment of FIGS. 1–8. This being so, detailed description of the disc brake components other than the flexible strap shown in FIGS. 9–13 is omitted here, it being understood that like numerals refer to like parts in all the figures.

Thus, a flexible strap shown generally at 141 in FIG. 9 supports the caliper 53 relative to the rotor (not shown) in the same manner as the strap 103 of FIGS. 1–8. An inner radial flange 143 of the strap 141 is secured to the torque plate web 47 by screws 145 which extend through openings 146 in the flange 143. The strap 141 has a laterally offset arm 147 having one end interconnected with the flange 143 by a web 149 and disposed in spaced confronting relation to the caliper leg 55. A spring leg 151 extends substantially at a right angle from the other end of the arm 147 and is connected to the caliper 53 by screws 153 extending through openings 154 in the leg 151.

With the strap 141 assembled to the torque plate web 47 and to the caliper 53, as shown in FIG. 9, the strap exerts a spring-like force on the caliper and biases it toward the left, keeping the brake lining corresponding to brake lining 91 shown in FIGS. 2 and 3 in light engagement with the rotor. As this brake lining wears, the strap 141 shifts the caliper 53 to the left accordingly and in doing so, the strap arm 147 pivots in a counterclockwise direction relative to the web 149 while the spring leg 151 pivots in a clockwise direction relative to the arm 147.

Pivoting action between these parts takes place along a parallel, spaced pair of solid state hinges 155, 157 formed between the strap arm 147 and web 149, and between the arm 147 and leg 151, respectively. As in the flexible strap 103 of FIGS. 1–8, the strap arm 147 is elastically bent in a clockwise direction relative to the web 149 and the strap leg 151 is elastically bent in a counterclockwise direction relative to the arm 147 to effect the desired pivoting action between these parts and keep the axis of the cylinder bore 67 perpendicular to the faces of the rotor 19 (FIG. 2). Thus, for the construction shown, the spring force tending to pivot the arm 147 relative to the web 149 is slightly greater than the force tending to pivot the leg 151 relative to the arm 147 because of the greater length of the arm 147 as compared with the leg 151. Of course, if the arm 147 and the leg 151 were equal in length, or if the arm 147 were shorter, the spring force on the arm 147 should be equal to or less than the spring force on the leg 151 accordingly.

The flexible strap 141 shown in FIGS. 9–13 desirably is of relatively inexpensive construction in that it is all one-piece and has a substantially uniform thickness. The material from which the strap is fabricated must be sufficiently flexible to obtain proper pivoting action at the hinges 155, 157 so that it might be necessary to reinforce the strap 141 at its other areas to prevent bending or flexing thereof and insure that the caliper 53 is properly oriented relative to the rotor at all times. To this end, the strap web 149 has a pair of flanges 159, 161 extending substantially perpendicular thereto, one at either side thereof. Similarly, the strap arm 147 and the spring leg 151 each has a pair of flanges 163, 165 and 167, 169, respectively, extending substantially perpendicular thereto and one at either side thereof. As shown in the figures, the flanges 159, 161, 163, 165, 167, 169 are spaced from the hinges 155, 157 so that pivotal action at these hinges is unimpeded. However, these flanges do serve to rigidify the strap arm 147, web 149 and leg 151 and prevent them from bending or flexing intermediate their length. If desired, the strap arm 149 may be further rigidified by a pair of laterally spaced ribs 171, 173 formed therein. In all other respects, the strap 141 functions substantially identical to the strap 103 of FIGS. 1–8.

By the foregoing, there has been disclosed a highly improved disc brake calculated to fulfill the inventive objects set out and while a preferred embodiment of the present invention has been illustrated and described in detail, various additions, substitutions, modifications and omissions may be made thereto without departing from the spirit of the invention as encompassed by the appended claims.

What is claimed is:

1. A disc brake for use with a rotor having braking faces on opposite sides thereof, said brake comprising a housing having generally opposed legs lying on opposite sides of the rotor, fluid motor means carried by one of said legs for pressing a first brake shoe means into frictional engagement with a first rotor face, said fluid motor means, where energized, biasing said housing in one direction to press a second brake shoe means against a second rotor face opposite said first face, yieldable means having a fixed first portion and a second portion remote from said first portion in supporting engagement with and biasing said housing in said one direction, said yieldable means having first and second spaced pivot means intermediate said first and second portions allowing relative translation between said first and second portions in said one direction normal to said rotor faces.

2. A disk brake as defined in claim 1 which includes friction means resisting movement of said housing normal to said rotor faces, the force of said friction means being overcome by the biasing force of said yieldable means.

3. A disc brake as defined in claim 1 including means resiliently supporting said housing.

4. A disc brake as defined in claim 1 wherein said yieldable means second portion is fixed to said housing.

5. A disc brake as defined in claim 1 wherein said yieldable means includes a third portion intermediate said first and second portions, said first and second pivot means interconnecting said first and third portions and said second and third portions, respectively.

6. A disc brake as defined in claim 5 wherein said first and second pivot means are solid state hinges.

7. A disc brake as defined in claim 1 wherein said first and second pivot means are parallel.

8. A disc brake as defined in claim 5 wherein said second portion includes spaced fingers fixed at one end to said housing and pivotally interconnected to said third portion at their other ends.

9. A disc brake as defined in claim 5 wherein said second and third portions define an acute angle.

10. A disc brake as defined in claim 6 wherein said second and third portions are prestressed about said second and first pivot means.

11. A disc brake as defined in claim 1 which includes a fixed torque member, said yieldable means first portion being fixed to said torque member.

12. A disc brake as defined in claim 11 wherein said torque means engages said housing at each side thereof and wherein said yieldable means second portion is fixed to said housing at an area spaced axially from said torque means.

13. A disc brake as defined in claim 5 wherein said second and third portions are resiliently biased for pivotal movement about said second and first pivot means by substantially equal forces.

14. A disc brake as defined in claim 5 wherein the longer of said second and third portions is resiliently biased for pivotal movement about its respective pivot means by a force greater than the shorter of said last-mentioned portions.

15. A disc brake as defined in claim 2 which includes a fixed torque means and wherein said friction means includes elongate means fixed to said housing and frictionally engaged by means carried by said torque means.

16. A disc brake as defined in claim 15 wherein said elongate means includes a pair of pins and said torque means has a pair of grommets carried thereby and frictionally engaging said pins.

17. A disc brake as defined in claim 16 wherein said grommets surround and resiliently support said pins.

18. A disc brake as defined in claim 5 wherein said second portion includes a spring leg fixed at one end to said housing and pivotally interconnected to said third portion at its other end.

19. A disc brake as defined in claim 5 wherein said second and third portions define substantially a right angle.

20. A disc brake as defined in claim 6 wherein said yieldable means is of integral construction and wherein said hinges are reduced thickness areas.

21. A disc brake as defined in claim 6 wherein said yieldable means is of integral construction and including reinforcement means integral with said yieldable means for preventing deflection of said first, second and third portions.

22. A disc brake as defined in claim 21 wherein said reinforcement means include a flange extending substantially perpendicular to each said first, second and third portions and at each side thereof.

23. A disc brake as defined in claim 1 wherein said yieldable means normally holds said second brake shoe means in light contact with said second rotor face.

24. A disc brake for use with a rotor having braking faces on opposite sides thereof, said disc brake comprising a caliper housing embracing a peripheral portion of the rotor and having leg portions extending on opposite sides of the rotor, a fluid motor associated with one of said leg portions, a first brake shoe interposed between said fluid motor and one of the braking faces of the rotor, a second brake shoe interposed between the other leg of said caliper housing and the other braking face of the rotor, and flexible means for supporting said caliper housing for movement in a plane perpendicular to the braking faces of the rotor upon actuation of said fluid motor for bringing said brake shoes into frictional engagement with the respective braking faces of the rotor, said flexible supporting means comprising a unitary support member having a first portion adapted to be fixed against rotation relative to the rotor, a second portion integrally connected at one of its ends to said first portion and angularly disposed with respect thereto, said second portion extending adjacent one of said legs on the side of said one leg remote from the rotor, a third portion integrally connected to the other end of said second portion and angularly related thereto, and means for affixing said third portion to said caliper housing.

25. A disc brake as set forth in claim 24 wherein the areas of the support member connecting the first portion to the second portion and the second portion to the third portion are thinner than said portions for facilitating flexure of said second portion relative to said first portion and flexure of said third portion relative to said second portion about said areas upon movement of the caliper housing.

26. A disc brake as set forth in claim 24 wherein the third portion is bifurcated and is defined by spaced parts, said spaced parts being fixed to the caliper housing on opposite sides of the fluid motor and radially outwardly of the first portion.

References Cited

UNITED STATES PATENTS

| 3,181,654 | 5/1965 | Peras | 188—73 |
| 3,258,089 | 6/1966 | Hayes et al. | 188—73 |
| 3,299,991 | 1/1967 | De Castelet | 188—73 |
| 3,312,308 | 4/1967 | Watanabe | 188—72 |

FERGUS S. MIDDLETON, *Primary Examiner.*

MILTON BUCHLER, *Examiner.*

G. E. HALVOSA, *Assistant Examiner.*